US006863335B2

(12) United States Patent
Lopez Torres et al.

(10) Patent No.: US 6,863,335 B2
(45) Date of Patent: Mar. 8, 2005

(54) GEOMETRICALLY MODIFIED INNER VEHICLE PANEL CAPABLE OF DEFORMING UNDER IMPACT

(75) Inventors: David Lopez Torres, Valladolid (ES); Carlos Alonso Sastre, Cervera de Pisuerga (ES); Roborto Yusta Vicente, Cuellar (ES); Marta Lopez Del Hierro, Burgos (ES)

(73) Assignee: Grupo Autolin Ingenieria, S. A., Burgos (ES)

( * ) Notice: Subject to any disclaimer, the term of this patent is extended or adjusted under 35 U.S.C. 154(b) by 0 days.

(21) Appl. No.: 10/380,531

(22) PCT Filed: Apr. 5, 2001

(86) PCT No.: PCT/ES01/00137
§ 371 (c)(1),
(2), (4) Date: Mar. 2, 2004

(87) PCT Pub. No.: WO02/081265
PCT Pub. Date: Oct. 17, 2002

(65) Prior Publication Data
US 2004/0135399 A1 Jul. 15, 2004

(51) Int. Cl.[7] .................................................. B60J 5/00
(52) U.S. Cl. ................................. 296/146.7; 296/187.12
(58) Field of Search .......................... 296/146.7, 187.12

(56) References Cited

U.S. PATENT DOCUMENTS

| 3,989,275 | A  | * | 11/1976 | Finch et al. ................. 280/751 |
| 5,482,343 | A  | * | 1/1996  | Bradac ....................... 296/39.1 |
| 6,170,902 | B1 |   | 1/2001  | Sakuma et al. |
| 6,422,640 | B2 | * | 7/2002  | Whitehead et al. ....... 296/146.7 |
| 6,619,724 | B2 | * | 9/2003  | Blomeling et al. ...... 296/146.5 |

FOREIGN PATENT DOCUMENTS

| DE | 43 37 949 A1 | 5/1994 |
| GB | 2 238 989 A  | 6/1991 |
| JP | 5-32127 *    | 2/1993 |
| WO | WO99/44847 A1 | 9/1999 |
| WO | WO01/05611 A1 | 1/2001 |

* cited by examiner

Primary Examiner—Joseph D. Pape
(74) Attorney, Agent, or Firm—Browdy and Neimark, P.L.L.C.

(57) ABSTRACT

This is an inner panel for vehicle equipped with protruding areas (2) towards the interior of the vehicle passenger compartment, which is provided with some grooves (6) made in the rear side of the panel in the areas adjacent to the protruding sections, which manage to dampen the influence of these on the occupants.

8 Claims, 1 Drawing Sheet

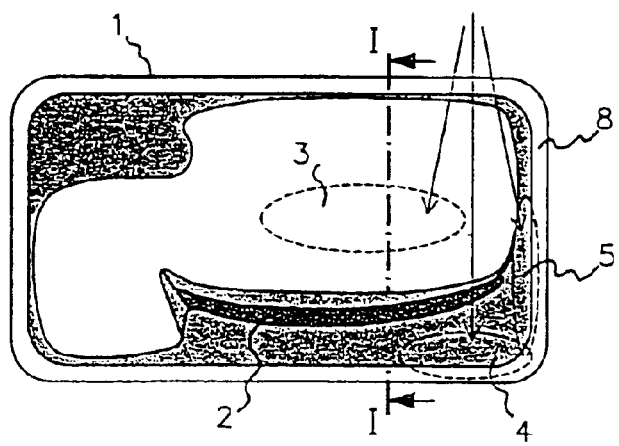
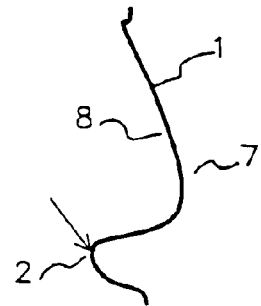
Fig:1  Fig:2
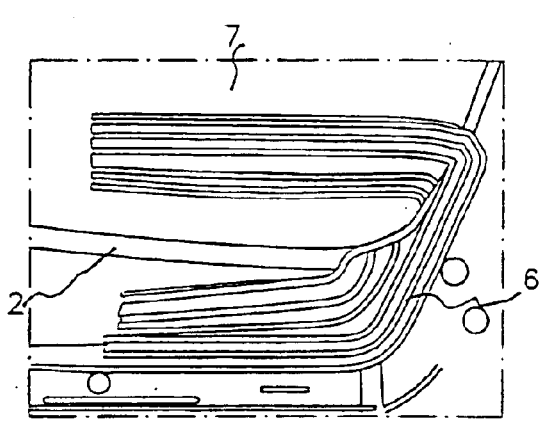
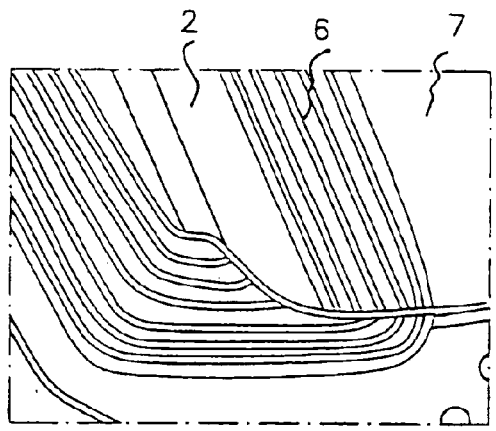
Fig:3  Fig:4
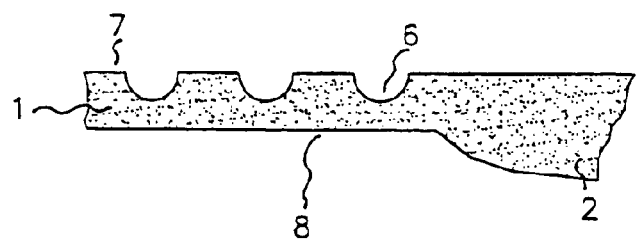
Fig:5

GEOMETRICALLY MODIFIED INNER VEHICLE PANEL CAPABLE OF DEFORMING UNDER IMPACT

FIELD

This invention relates to a geometrically modified vehicle inner panel capable of deforming on impact, made of injected plastic material, with a totally finished visible side which is situated towards the inside of the vehicle passenger compartment and with the other non-visible side which faces the door of the vehicle.

BACKGROUND

Panels of this type usually have at least one projection towards the vehicle passenger compartment, consisting of the armrest, which is the item closest to the abdomen of the driver, and there is normally a distance of between 7 and 10 mm between the armrest and the thorax. In most cases, these items are produced as panel inserts connected to the panel, although the possibility is not ruled out that the panel is a single part equipped with the said projections.

The context of the invention refers to the contribution of protective measures for the occupants of the vehicle in the case of lateral impact and more specifically to protection for the abdominal area of the occupant.

Throughout this description we shall refer, by way of example, to a panel provided with a panel insert, while understanding that this does not exclude the possibility that the panel might be one single part not equipped with the said panel insert.

As is well known, once the occupant is located in the vehicle passenger compartment, at one side is the door panel with its panel insert, on which different items are housed. The armrest is usually situated at the height of the abdomen and is integrated into the panel insert in the panel. Due to its purpose and the items integrated into it, the armrest protrudes approximately some 60 mm in relation to the panel itself, finishing at a distance of between 7 and 10 mm from the thorax of the user, as indicated above.

In case of lateral impact, once that the door has collapsed and the deformation and force of the impact reach the inner panel, this panel moves towards the occupant and the occupant also moves towards it, and it is the area of the armrest that first reaches the said occupant precisely at the height of the abdomen.

The geometry of the panel insert, with a series of concavities and convexities, has a high level of rigidity in relation to the rest of the panel, so that once it comes into contact with the occupant, it does not absorb the impact as it does not absorb the desired energy levels and transmits levels of force which are higher than acceptable to the occupant.

For the above reasons, the problem which has to be solved is that of penetration of the armrest into the thorax-abdomen area of the occupant in case of lateral impact, so that the levels of force and intrusion that reach the occupant do not exceed certain threshold limits.

As far as is known, there are already several solutions directed towards protecting the occupant in case of lateral impact.

The aim of some of these solutions is to increase the capacity of the door unit to absorb the energy of the impact, so as to reduce the relative acceleration between the occupant and the side panel and so reduce the force of the impact on the thorax.

In one solution, within this trend, at least one additional part is included in the door panel, between the non-visible side of the panel and the inner sheet metal of the door, with these additional parts consisting of a set of walls, ribs or cells that deform plastically to compression and bending during impact, thus absorbing energy.

In the design of these additional parts or items it must be taken into account that the energy has to be absorbed at levels of force and with deformations that do not exceed the permitted thresholds.

This way of proceeding is subject to limitations, especially from the point of view of the need to manufacture additional parts and carry out subassemblies. All this not only increases the cost and the weight of the resulting unit, but also the removal time, if this were possible, reducing their recyclability.

Besides this, the height of the ribs and the areas where they can be situated is limited by the space available between the door panel and the metal structure of the said door.

Another of the known solutions consists of the use of materials with a capacity to absorb energy by means of plastic deformation at some levels of force and deformation that make them ideal for this application.

Among these materials are polyurethane foams and expanded polypropylene in different densities. The material, in blocks, is also placed between the inner panel and the inner sheet metal of the door, forming a sandwich structure, and its effectiveness will depend on the density of the open cells made in the added material.

The limitations of this way of proceeding coincide with those of the previous case.

Another known solution avoids the manufacture and assembly operations mentioned above by manufacturing the door inner panel with the energy dissipation item already incorporated and forming one single part. In this case, the non-visible side of the panel is provided with a series of latticed ribs, which can be either connected with each other or not, giving rise to a cell configuration, which is deformed plastically in case of impact.

Although this solution does not have the disadvantages of having additional parts, subassemblies, cost increases and recycling difficulties, it is however limited by the space that exists between the door panel and the metal structure of the door, and by the increase in weight of the resulting part.

In the particular case of the pillars of the vehicle passenger compartment, other materials are also used, such as impact modified Acrylonitile butadiene styrene (ABS) and mixtures of polycarbonate/PBT, whose performance to temperature variations is more stable.

The main purpose for the use of these materials is that in case of impact, the parts do not suffer brittle fracture and therefore no sharp edges are created that might cause lacerations to the occupant of the vehicle.

Nevertheless, they have the disadvantage that the materials developed for this purpose have a higher cost than those more generally used.

Other types of solutions protect the occupant of the vehicle by dampening the impact against the door panel, for instance by using side airbags or inflatable tubular airbags Obviously, the main disadvantage of these systems lies in their complexity, as for them to come into action, they must be fitted with acceleration sensors whose response time, must be very short. Moreover, the side panel and the whole door in general has to be prepared in order to house the system, with the consequent space limitations and the design complexity that this involves, all of which results in a higher cost than those of the previous solutions.

SUMMARY

The object of the invention is to provide a door panel, which while dampening the impact on the occupant, does not require the introduction of any additional item into the said panel and, therefore, is not limited by the space that exists in the chamber which is formed between the panel and the inner sheet metal of the door.

Another object of the invention is to provide a door panel that does not involve any increase in cost and weight.

Another object of the invention is to provide a door panel that can be recycled without the slightest difficulty, just like a conventional panel.

In order to achieve these objectives, the invention presents a panel which in case of impact, acts as if it were a spring, so that it dampens or absorbs the impact on the occupant starting from a force within the permitted threshold.

In particular, the solution is applied in the area of the armrest mounted on the panel insert, which is generally the part that most protrudes towards the interior of the vehicle passenger compartment and the closest to the occupant, although its application to other protruding sections of the panel that might cause problems is not ruled out.

Starting from the said panel insert and with a specific geometry and material, the most decisive areas of the panel at the time of lateral impact have been located, areas whose structural rigidity prevents the armrest, for example, from becoming deformed and moving back on coming into contact with the occupant, because if this impact is not dampened, the occupant suffers a stronger force on the lower part of the thorax than permitted by existing regulations.

This structural rigidity of the part in the areas close to the armrest arises from its very design, from sections with a high inertial module, from the thickness of the wall and from the type of material used.

From this it is derived that the force of impact required so that the said critical areas start to become deformed is high while the levels of deformation achieved are low.

As indicated previously, the area that most protrudes from the panel insert, usually the armrest, is surrounded by areas that are rigid and which are submitted to compression and bending forces during impact, which means that their robustness does not allow these areas to buckle.

From the point of view of the invention, if these rigid areas adjacent to the armrest are produced in such a way that they bend to bucking during impact, it permits the shift of the armrest elastically, thus absorbing part of the energy of the said impact.

This circumstance was tried experimentally with excellent results, so that by reducing the section or thickness of the panel in areas approximately parallel to the trajectory of the armrest, the robustness of these rigid critical areas of the part is reduced and this favors the appearance of bending and buckling.

Like this, the geometry of the panel insert is modified, so that it is possible to reduce the force of the impact on the occupant with this reduction of the rigidity of the areas close to the armrest, reducing the rigidity of the panel insert to a limit, which is set by the minimum rigidity that the part must have in order to withstand other requirement that are made on it in the course of its normal use.

The material has to stay within the elastic performance area during impact, which means that the geometry of the part will return to its initial state once that the forces that act on it stop.

The recovery of the deformation begins to take place after the occupant has received the impact, which has been reduced, and when the occupant has started to move away from the panel insert.

A set of grooves or slots are preferably made in the critical areas close to the armrest, with these grooves or slots being established in a perpendicular direction to the direction of the application of the most demanding impact tests, which is in turn in a direction perpendicular to the vertical plane of the door.

Given that in these tests, the most stringent is the front impact test in a perpendicular direction to the plane of the part, in each position the said grooves are established in a perpendicular direction to the previously mentioned direction, and in any case following the trajectory of the armrest or protruding item in question.

The grooves are made only in the internal side towards the door, with the visible side conserving its original appearance and without any a visible marks or signs that might indicate their existence.

As usual, when an armrest has a determined trajectory line with changes in this trajectory, the grooves made in the critical areas adjacent to this line are adjusted so as to be in a direction parallel to it.

The number and depth of the grooves are variable in terms of the material, its thickness and the panel to which they are applied.

The grooves can be continuous or discontinuous in their path through the length of the panel, with the most advisable solution being used in each case.

BRIEF DESCRIPTION OF THE DRAWING

All these and other details of the invention can be observed on the accompanying sheet of drawings, on which the following are represented:

FIG. 1 is a plan view of a panel insert for a door panel in which the technique of the invention is applied.

FIG. 2 is the result of the view along the cross section I—I shown in FIG. 1.

FIGS. 3 and 4 show two representations of the side of the panel insert towards the door.

FIG. 5 is a detail of the grooves in the critical areas, in accordance with the invention.

DETAILED DESCRIPTION

In accordance with FIG. 1, the panel insert (1), which is mounted on the door panel, is seen from its side (8) facing towards the passenger compartment, and has measurements of approximately 630 mm long by 340 mm high. On it, an armrest (2) is represented, following a specific line on the panel, together with the rigid critical areas (3, 4, 5) adjacent to the armrest.

As shown in FIG. 2, the armrest (2) protrudes out from the visible side (8) of the panel insert. The rear side (7) of the panel insert, in which the grooves are made, can also be appreciated.

In accordance with FIGS. 3 and 4, the grooves (6) made in the rear side (7) of the panel insert (1) in the door panel can be observed, and it can be seen that these grooves run almost parallel to the trajectory of the armrest, performing the function of a spring against an impact, by which the force of the impact on the occupant is reduced by the deformation and recovery from this deformation when the occupant begins to move away from the panel insert of the door panel.

Looking now at FIG. 5, we can point out the grooves (6) cut in the rear side (7) of the panel insert (1), with its visible side (8) perfectly finished, in which the armrest (2) can be appreciated.

A test was carried out on the part shown in FIG. 1, in which this part was made of injected polypropylene, with 20% talcum and with a wall thickness of 2.5 mm.

This part, with the detail shown in FIG. 3, for example, is provided with five grooves or slots in the section situated above the projecting armrest (2), another five grooves in the section situated below this armrest and two grooves in a lateral position above the said armrest.

The depth of these grooves was approximately 2 mm and the distance between the bottoms of two consecutive grooves was approximately 6.5 mm.

The deformable pendulum crash test carried out on this panel insert, without grooves, provided a peak force of 1660 N on the abdomen.

The same test on the same panel insert provided with grooves in the rigid areas gave a result of a peak force of 1100 N, substantially reducing it by approximately one third in relation to the panel insert without the grooves, which is the purpose of this invention.

As mentioned previously, the invention is applied to inner panels either provided with a panel insert or without a panel insert. In the first of these hypotheses, the grooves are cut in the panel insert itself that the panel is provided with, whereas in the second case they are in the body of the panel itself.

In the same way, for the appropriate purposes it is pointed out that the invention is applicable to any type of vehicle interior panel which is provided with areas that protrude towards the interior of the passenger compartment of the said vehicle, and which might mean danger for the integrity of the occupants.

What is claimed is:

1. A geometrically modified vehicle inner panel capable of deforming on impact, where the inner panel is to be mounted between a vehicle door and a vehicle passenger compartment, or between a vehicle door panel and a vehicle passenger compartment, where the inner panel is made of injected plastic material with at least one protruding area (2) protruding towards the vehicle passenger compartment, with said at last one protruding area (2) disposed following a certain trajectory, with rigid areas (3, 4, 5) surrounding the protruding area (2), the rigid areas (3, 4, 5) having a constant thickness, comprising a rear side (7) of the inner panel, which does not face the vehicle passenger compartment, having at least one groove (6) that reduces the thickness of the panel, said at least one groove (6) being situated in proximity of the protruding area (2), following the trajectory of the protruding area (2) and occupying the rigid areas (3, 4, 5) adjacent to the protruding area (2).

2. The geometrically modified vehicle inner panel capable of deforming on impact, in accordance with claim 1, wherein the inner panel, on which the grooves (6) are made, is the door panel itself and not an insert or additional part mounted on the door panel.

3. The geometrically modified vehicle inner panel capable of deforming on impact, in accordance with claim 1, wherein the inner panel on which the grooves (6) are made, is a panel insert (1) that is mounted on the door panel.

4. The geometrically modified vehicle inner panel capable of deforming on impact, in accordance with any one of claims 1 and 3, wherein the grooves (6) are situated in a direction perpendicular to the vertical plane of the vehicle door.

5. The geometrically modified vehicle inner panel capable of deforming on impact, in accordance with any one of claims 1 and 3, wherein the grooves (6) are made in groups arranged parallel to each other in areas adjacent to the protruding area (2).

6. The geometrically modified vehicle inner panel capable of deforming on impact, in accordance with any one of claims 1 and 3, wherein the grooves (6) are continuous throughout their entire path.

7. The geometrically modified vehicle inner panel capable of deforming on impact, in accordance with any one of claims 1 and 3, wherein the grooves (6) are discontinuous.

8. The geometrically modified vehicle inner panel capable of deforming on impact, in accordance with any one of claims 1 and 3, wherein the grooves (6) are grouped in sets of several parallel grooves, which are separated from each other.

* * * * *